Oct. 9, 1928.

G. E. OAKLEY 1,687,223

CAR DOOR CONTROL

Filed June 17, 1925    2 Sheets-Sheet 1

INVENTOR
GEORGE E. OAKLEY
BY E. M. Bentley
ATTORNEY

Oct. 9, 1928.
G. E. OAKLEY
CAR DOOR CONTROL
Filed June 17, 1925    2 Sheets-Sheet 2
1,687,223
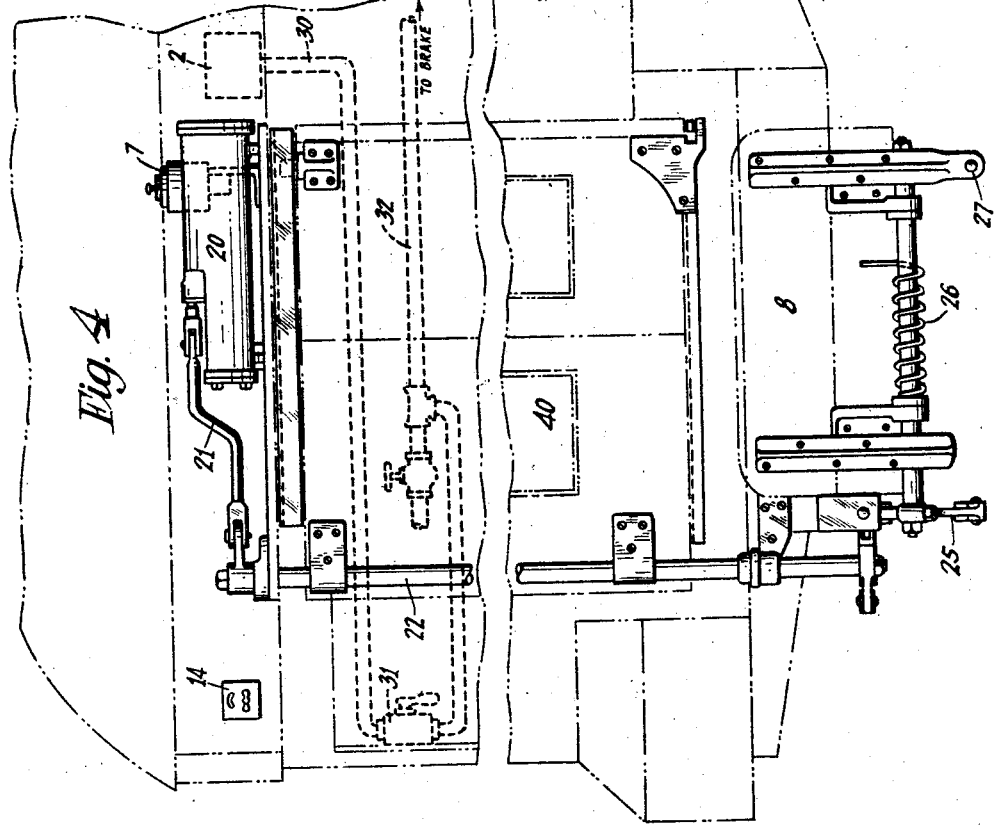
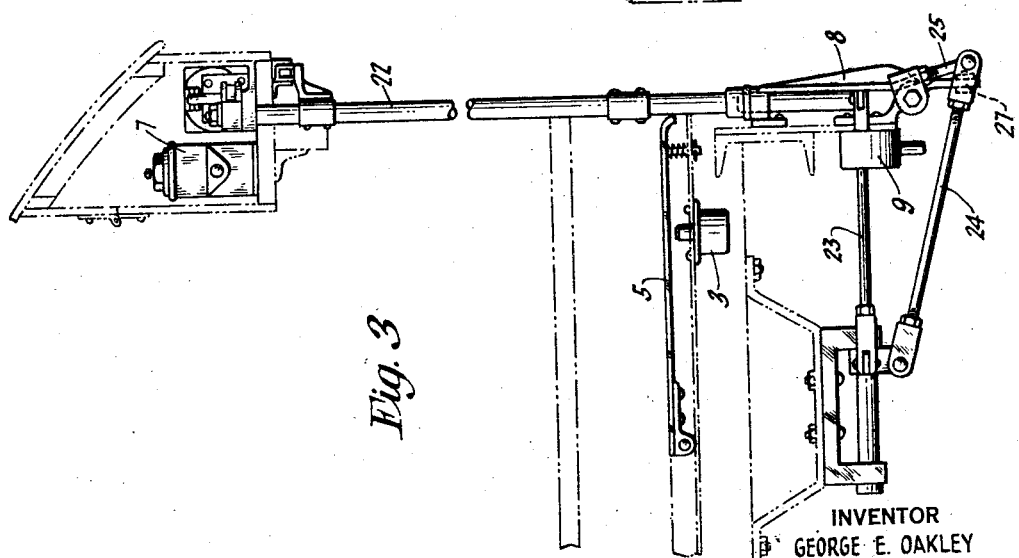
INVENTOR
GEORGE E. OAKLEY
BY
E. M. Bentley
ATTORNEY Patented Oct. 9, 1928.

1,687,223

UNITED STATES PATENT OFFICE.

GEORGE E. OAKLEY, OF ALBANY, NEW YORK, ASSIGNOR, BY MESNE ASSIGNMENTS, TO CONSOLIDATED CAR-HEATING COMPANY INC., OF ALBANY, NEW YORK, A CORPORATION OF NEW YORK.

CAR-DOOR CONTROL.

Application filed June 17, 1925. Serial No. 37,792.

Figure 1:
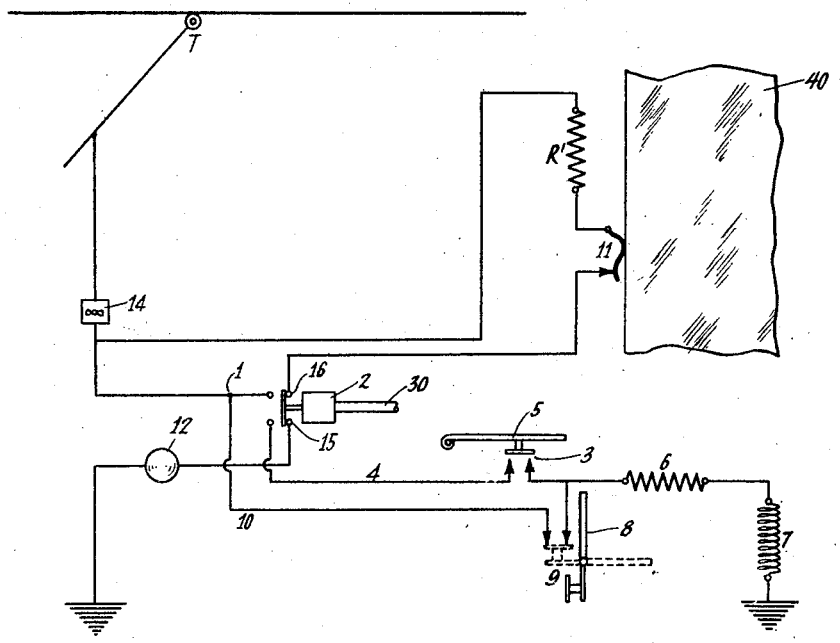
Figure 2:
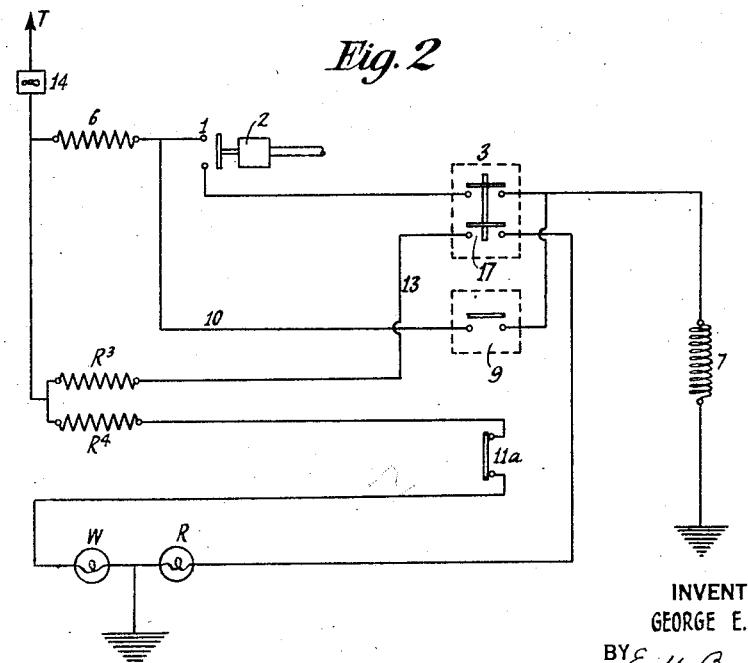

For a detailed description of the present form of my invention, reference may be had to the following specification and to the accompanying drawings forming a part thereof, wherein Figs. 1 and 2 are circuit diagrams;
Fig. 3 shows the floor treadle, and
Fig. 4 the car stop.

It has heretofore been proposed, in systems of pneumatic car-door operation, to utilize the weight of an outgoing passenger for automatically controlling the actuating motor of the exit door. For this purpose a section of the vestibule floor is so arranged as to act as a treadle and be slightly depressed when a passenger steps thereon. Thereby it serves to set the valves of a pneumatic door motor in a position to cause the door-opening movement. The mechanism is also so interlocked with the car step that when the passenger steps off from said floor-section onto the car step, the door will not release at once, but will remain open until the passenger has finally removed his weight from the car step. This mechanism can not, however, operate while the car is running because the air supply for the motor is cut off until the motorman sets his brakes and admits air to the supply pipe for the door-opening action of the motor.

I have devised certain means for simplifying the aforesaid arrangement and controlling the motor by electric circuits, which, in turn, are controlled by the floor treadle and by the other agencies associated therewith.

Referring to the drawing, Figs. 3 and 4, 20 represents the motor for the exit door 40 of the car. By means of rod 21 the motor 20 operates the vertical door-shaft 22 which, at its lower end, also operates a slide 23 and the said slide operates the door-step 8 by means of link 24 and crank-arm 25. The object is to have the door-opening control-valve of the motor 20 operated automatically whenever a passenger stands on a treadle plate in the floor of the vestibule just in front of the door ready to make his exit through the door as soon as it opens. This treadle plate is shown at 5 in Fig. 3 and just under it is a treadle-switch 3, the stem of which will be hit and depressed by the treadle plate whenever a passenger steps on it. A similar switch 9 is so located that its stem will be engaged and actuated by an arm 27 on the folding step 8 of the car. This occurs whenever a passenger steps on, or stands on the lowered step 8, thereby giving the arm 27 an extra lift sufficient to operate the switch. The step-switch 9 serves to maintain the door open, so long as the passenger is on the step, even if treadle-switch 3 has become open by the passenger moving off the treadle 5 and even if the motorman has thrown his controller from door-opening to door-closing position. A third switch 2 is operated by the actuating agency of the motor which, in this case, is compressed air. Switch 2 is a pressure switch connected to the air-supply pipe 30 leading to the switch and under control of the motorman's manual air-valve 31. The pressure in pipe 30 acts to close the contacts of switch 2. This air-switch governs the circuit leading to the treadle switch 3, so that the closure of the treadle switch by the weight of the passenger is of no avail to open the door unless the motorman has just admitted air pressure by his hand valve 31 to the supply pipe 30, thereby closing switch 2 and unless, moreover, he has also set his brakes, since the pipe 30 derives its air from the pipe 32 leading to the brake cylinder and only receives pressure when the brakes are applied. Other suitable means may be used to insure that the brakes are set when pressure is admitted to air-switch 2. Turning to the circuit diagrams of Fig. 1, the circuit from the trolley T passes first through a snap-switch 14, which is preferably provided with a fuse, and goes thence to point 1 where it branches, one branch, controlled by air-switch 2, going to the treadle-switch 3, and the other, not controlled by air-switch 2, being a maintaining circuit, going to the step-switch 9. The reunited branches go to a resistance 6 and thence through the coil of magnetic valve 7 to ground. It is the valve 7 which finally causes the door to open, and this valve only acts under the conditions just stated. It will then remain energized, and thereby hold the door open, until the passenger finally moves off the car step 8 and the step-spring 26 folds up the step far enough to release the step-switch 9. That will release the magnetic air-valve 7 and the door will automatically close without action by the motorman. The air-switch 2 is also provided with back-contacts 15 and 16 in the usual door-signal circuit controlled by door-switch 11. This door-switch is closed whenever the door 40 is open. This circuit leads to signal 12 at the motorman's station. This circuit is also controlled by said contacts 15, 16, and is closed at those contacts when the air-switch 2 is open. Thus in case the air switch is released by the motorman before the passenger has moved off of the door-step 8, a signal will be given to the motorman. This will warn the motorman not to proceed and release his brakes after he has released the air switch because a passenger is still on the steps.

In Fig. 2 I have shown a supplementary arrangement of the circuits for signalling purposes. In this case the resistance 6 is placed between the snap-switch 14 and the point 1. The treadle-switch 3 has an extra pair of contacts 17 in a signal circuit leading from the trolley through a resistance $R^3$ and by wire 13 to the said extra contacts 17 and thence to a red lamp R at the motorman's station. Thereby, when a passenger steps on the treadle he automatically notifies the motorman, by closing the red-light circuit, that he wants to get off. The contacts of the door-switch $11^a$ are, in this case, closed while the door is closed and thereby maintain a signal circuit from trolley through resistance $R^4$ and green light W. Thus the green light will normally show, but whenever a passenger steps on the treadle the red light will also appear. Thus the red light will notify the motorman that a passenger is on the treadle awaiting to get off. Otherwise he might not know that fact and so would not throw the air on supply-pipe 30. Also when he does throw air on the supply-pipe he knows, by the disappearance of the green light that the door has opened. This arrangement is of value when the exit door is at the rear of the car. When it is at the front end the motorman can see the passenger and the operation of the door, so that these signals are not needed.

What I claim as new and desire to secure by Letters Patent is:

1. The combination with a car door motor of a control circuit for said motor, a switch controlling said circuit, the operation of said switch being controlled by the agency which actuates the motor, a circuit maintaining switch, and a movably mounted floor treadle controlling said last mentioned switch.

2. The combination with a car-door motor, of a floor-treadle, a switch operated thereby, a second switch operated by the actuating agency of the motor, a control-circuit for the motor governed by both of said switches, and manual means for controlling said actuating agency.

3. The combination with a car-door motor, of a floor-treadle, a switch operated thereby, a second switch operated by the actuating agency of the motor, a control-circuit for the motor governed by both of said switches and a step-switch governing said control circuit independently of the other two switches.

4. The combination with a motor for the exit door of the car, of a magnetic controller therefor, a circuit including said controller, a switch in said circuit closed by the manual action of the motorman, a second switch in said circuit closed by a floor treadle adjacent to the door, and a third switch for closing said circuit independently of the two aforementioned switches by the action of the car step.

5. The combination with a pneumatic motor for an exit door of a car, of a door-opening valve for said motor, a magnet for actuating said valve, a circuit for said magnet, an air-switch in said circuit operated by the pressure-supply, a manual valve for admitting pressure to said air switch, a second switch in said circuit actuated by a floor treadle, and a maintaining circuit for said magnet controlled by the car-step.

6. The combination with a motor for the exit door of a car, of a controlling magnet for said motor, a circuit for said magnet controlled by a floor-treadle, and a maintaining circuit therefor controlled by a folding door-step.

7. The combination with a car-door motor of a controlling magnet therefor, two switches in series with said magnet one controlled by the motor-actuating agency, the other by a treadle-switch, and a maintaining circuit shunting said switches and controlled by the folding car-step.

8. The combination with a car door motor of a control circuit for said motor, a switch controlling said circuit, the operation of said switch being controlled by the agency which actuates the motor, a circuit maintaining switch, a movably mounted floor treadle controlling said last mentioned switch, a motorman's signal, and means controlled by said treadle for automatically setting said signal.

9. The combination with a motor for the exit door of a car, of a controlling magnet for said motor governed by a treadle-switch and by a second switch operated by the motor-actuating agency, of a motorman's signal controlled by said second switch and by the car door.

Signed at Albany, in the county of Albany, State of New York, this 15th day of June, 1925.

GEORGE E. OAKLEY.